United States Patent [19]
Green

[11] 3,751,068
[45] Aug. 7, 1973

[54] DOOR-OPERATED VEHICLE BOARDING STEP
[76] Inventor: Howard C. R. Green, 1942 11th Ave. W., Eugene, Oreg.
[22] Filed: Sept. 9, 1971
[21] Appl. No.: 179,029

[52] U.S. Cl. .............................................. 280/166
[51] Int. Cl. ............................................. B60r 3/02
[58] Field of Search .................. 280/166, 163, 164; 105/437; 182/88

[56] References Cited
UNITED STATES PATENTS
| | | | |
|---|---|---|---|
| 3,572,753 | 3/1971 | Claassen | 280/166 |
| 3,671,058 | 6/1972 | Kent | 280/166 |
| 2,041,640 | 5/1936 | Goss | 280/166 |
| 2,125,085 | 7/1938 | Pool | 280/166 |

Primary Examiner—Leo Friaglia
Assistant Examiner—Robert R. Song
Attorney—Eugene D. Farley

[57] ABSTRACT

A boarding step for trucks, construction equipment and other vehicles having hinged entrance doors comprises a telescoping support arm having on its inner end means for attachment to a first frame member beneath the vehicle and on its outer end a step. One end of a lever is pivotally connected to the vehicle frame and the other end to the outer segment of the telescoping support arm. Flexible link means interconnects the outer segment of the support arm and the door. Resilient means interconnects the outer segment of the support arm and a second frame member. Opening the door swings the step outwardly and downwardly to its extended use position. Closing the door permits the resilient means to shift the step inwardly and upwardly to its retracted storage position.

3 Claims, 5 Drawing Figures

PATENTED AUG 7 1973 3,751,068
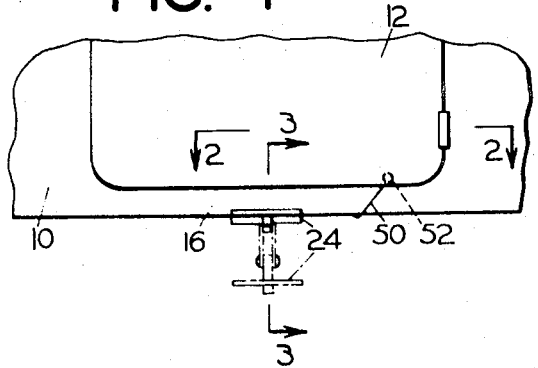
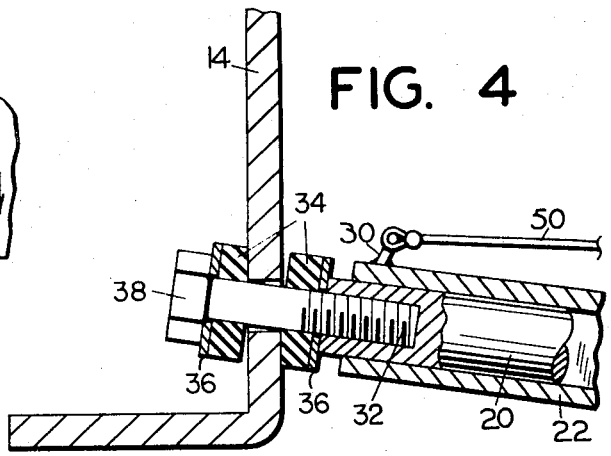
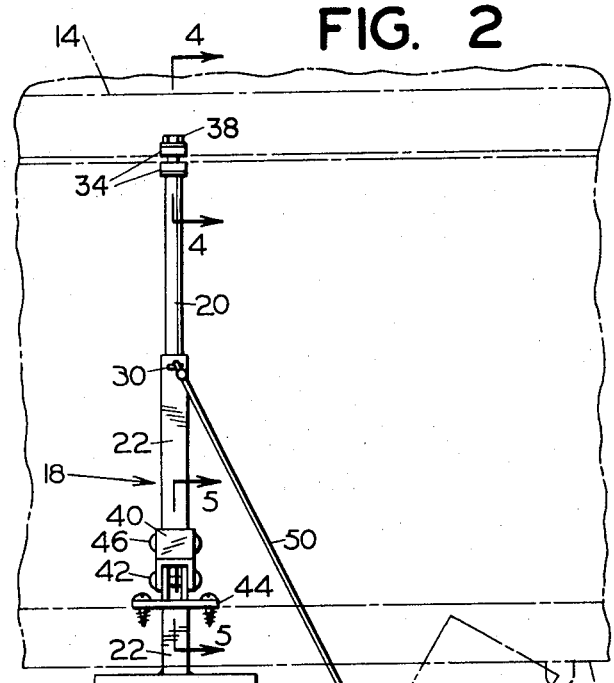
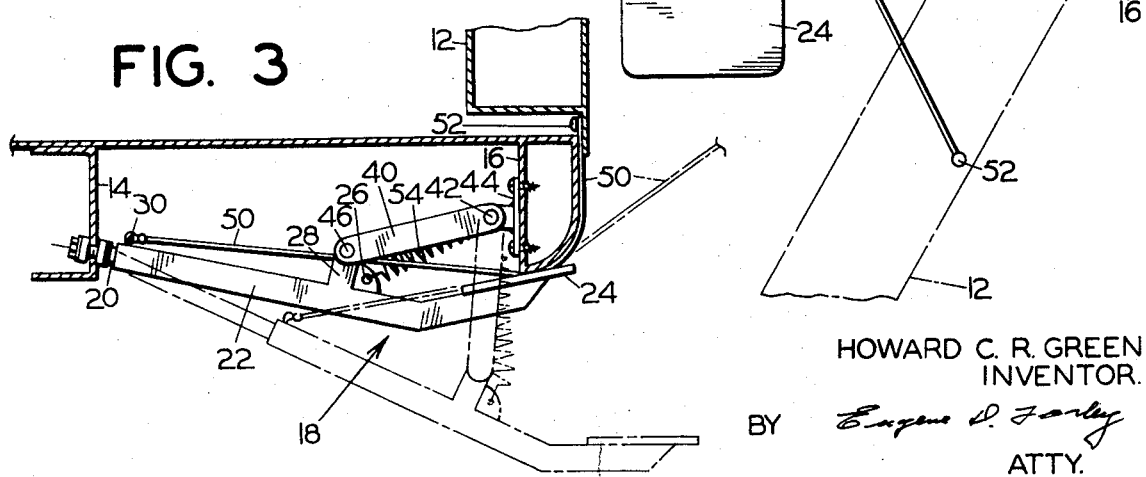
HOWARD C. R. GREEN
INVENTOR.
BY Eugene D. Farley
ATTY.

DOOR-OPERATED VEHICLE BOARDING STEP

This invention relates to door-operated boarding steps.

The cabs of pickup trucks and certain other vehicles are so far off the ground that it is difficult and even dangerous to enter them. It is the general purpose of the present invention to assist in entering the cabs of such vehicles by providing a boarding step which is operated between an extended, use position and a retracted, rest position by opening and closing the vehicle door.

It is another object of the present invention to provide a door-operated vehicle boarding step which is simple in construction, rugged and durable, mountable without structural modification of the vehicle, safe in its use position, out of the way in its rest position and universal in its application to many different types of vehicles.

The means in which the foregoing and other objects of this invention are accomplished will be apparent from the following specification and claims, considered together with the drawings, wherein:

FIG. 1 is a fragmentary view in elevation of a vehicle having the herein described boarding step mounted thereon;

FIGS. 2 and 3 are views in bottom plane and side elevation views, taken along lines 2—2 and 3—3 of FIG. 1, respectively, further illustrating the manner of application and use of the step; and FIGS. 4 and 5 are detail, enlarged, sectional views taken along lines 4—4 and 5—5 of FIG. 2, respectively, and further illustrating the manner of mounting the step.

In its broad concept, the herein described vehicle boarding step comprises a support arm having outer and inner telescoping segments, a step on the outer segment and attachment means on the inner segment for pivotal attachment to a vehicle frame member. A lever has on one of its ends pivotal means for attachment to a second vehicle frame member located beneath the vehicle outwardly of the first attachment means. On the other of its ends the lever has means for pivotal attachment to the outer telescoping arm segment.

A flexible link member interconnects the inner end of the support arm outer segment and the vehicle door. A coil spring or other resilient member resiliently interconnects the support arm outer segment and a frame member. Accordingly, opening the door shifts the step outwardly and downwardly to its use position against the action of the spring. Upon closing the door, spring action shifts the step inwardly and upwardly to its retracted, storage position beneath the vehicle.

Considering the foregoing in greater detail and with particular reference to the drawings:

As shown in FIGS. 1 and 3, the herein described boarding step is adapted for application to a vehicle comprising a body 10 equipped with a hinged door 12, a longitudinal frame member 14 inset from the side of the vehicle and a door sill 16 located outwardly a spaced distance from the frame member.

The boarding step assembly includes a telescoping support arm, indicated generally at 18. This arm in turn includes an inner segment 20 and an outer segment 22.

Outer segment 22 has on its outer end a step 24. Intermediate its ends it has both an eye 26 and a standard 28. At its inner end it has an eye 30.

Inner segment 20, which preferably telescopes within outer segment 22, has on its inner end pivotal attachment means for pivotally attaching it to vehicle frame member 14. As illustrated in FIG. 4, such means comprises a cap screw 32 which extends through an opening in frame member 14 and its threaded end is attached to the inner end of inner segment 20. Encircling the cap screw on opposite sides of the frame member 14 are a pair of resilient washers 34 backed by support washers 36 one of which abuts the end of inner segment 20 and the other of which abuts the head 38 of the screw.

The step assembly also includes a lever 40 which interconnects the outer segment of support arm 18 and sill 16. To this end the upper end of the lever is connected by a pivot pin or rivet 42 to a standard 44 affixed to the inner side face of sill 16. The lower end of lever arm is pivotally connected by pin 46 to standard 28.

Flexible link means interconnects the inner end of outer arm segment 22 and the lower margin of door 12. In the illustrated form of the invention the link means comprises an aircraft control cable or other flexible member 50. One end of the cable is connected to eye 30 on support arm segment 22. The other of its ends is connected to an anchor pin 52 carried by the door.

Resilient means further are provided resiliently interconnecting the support arm outer segment and a vehicle frame member. Such means preferably comprise a coil spring 54 having one of its ends connected to pivot pin 42 for lever 40, FIG. 5, and the other of its ends connected to eye 26 on support arm 22.

The manner of operation of the boarding step of my invention is illustrated particularly in FIG. 3.

Normally the step assumes its full line position withdrawn beneath the vehicle body and elevated sufficiently so that it will not snag on brush and obstructions traversed by the vehicle. However, upon opening the vehicle door cable 50 acts on the outer segment of telescoping support arm 18 to pull the latter outwardly. Lever 40 thereupon swings the support arm and attached step downwardly to the dotted line position of FIG. 3, but against the tension of spring 54. This is the use position of the step which it maintains as long as the vehicle door remains open. When the door is closed, spring 54 retracts support arm 18 to its full line rest position pending another use. In both positions of the arm, any slack in cable 50 is fully taken up, avoiding difficulty from that source.

Having thus described my invention in preferred embodiments, I claim:

1. A boarding step for vehicles having an entrance door movable between open and closed positions, the step comprising:
   a. a support arm having outer and inner telescoping segments,
   b. a step on the outer end of the outer segment,
   c. first pivotal attachment means on the inner end of the inner segment for pivotal attachment to a vehicle frame member located beneath the vehicle inwardly of the door,
   d. a lever having on one of its ends second pivotal attachment means for attachment to a second vehicle frame member located beneath the vehicle a spaced distance outwardly from the first attachment means, and on the other of its ends third pivotal attachment means attaching it to the outer telescoping arm segment intermediate the ends of the latter for moving the step downwardly as the outer arm segment moves outward relative to the inner segment, e. flexible link means interconnecting the inner end of the outer arm segment and the vehicle door for moving the outer arm segment outwardly upon opening of the door, and f. resilient means resiliently interconnecting the outer arm segment and a vehicle frame member for urging the support arm upwardly toward the vehicle.

2. The boarding step of claim 1 wherein the flexible link means comprises cable means.

3. The boarding step of claim 1 wherein the resilient means comprises coil spring means.

* * * * *